United States Patent
Kim et al.

(10) Patent No.: US 8,466,891 B2
(45) Date of Patent: Jun. 18, 2013

(54) TOUCH PANEL

(75) Inventors: Woon Chun Kim, Gyunggi-do (KR); Yong Soo Oh, Gyunggi-do (KR); Jong Young Lee, Gyunggi-do (KR)

(73) Assignee: Samsung Electro-Mechanics Co., Ltd., Suwon, Gyunggi-do (KR)

( * ) Notice: Subject to any disclaimer, the term of this patent is extended or adjusted under 35 U.S.C. 154(b) by 335 days.

(21) Appl. No.: 12/822,375

(22) Filed: Jun. 24, 2010

(65) Prior Publication Data

US 2011/0232975 A1    Sep. 29, 2011

(30) Foreign Application Priority Data

Mar. 25, 2010 (KR) .................. 10-2010-0026800

(51) Int. Cl.
*G06F 3/041* (2006.01)
(52) U.S. Cl.
USPC ............ 345/173; 345/204; 345/176; 345/104
(58) Field of Classification Search
None
See application file for complete search history.

(56) References Cited

U.S. PATENT DOCUMENTS 8,014,223 B2 *  9/2011  Kaneko et al. ............. 365/225.7
2010/0060602 A1 *  3/2010  Agari et al. .................. 345/173

FOREIGN PATENT DOCUMENTS

| JP | 2004240662 | 8/2004 |
| KR | 1020030049707 | 6/2003 |
| KR | 1020030055991 A | 7/2003 |

OTHER PUBLICATIONS

Office Action from counterpart Korean Patent Application No. 10-2010-0026800, May 26, 2011, 3 pages.
Office Action from counterpart Korean Patent Application No. 10-2010-0026800, mailed Nov. 17, 2011, 3 pages.

* cited by examiner

*Primary Examiner* — Muhammad N Edun
(74) *Attorney, Agent, or Firm* — Blakely, Sokoloff, Taylor & Zafman LLP

(57) ABSTRACT

Disclosed is a touch panel 100, which includes a transparent substrate 110 that includes a base part 120 and a projection part 130 projected from the base part 120, a transparent electrode 140 that is formed on the base part 120, signal wirings 150 that are formed on the transparent substrate, having one end connected to the transparent electrode 140 and the other end extended to the projection part 130, and a controller 160 that is disposed on the projection part 130 and is directly connected to the other end of the signal wiring 150.
The touch panel directly connects the signal wirings 150 to the controller 160 by adopting the projection part 130 to the transparent electrode 140, thereby making it possible to omit the flexible printing cable requiring manual work, and thus allows the roll to roll (R2R) process, thereby making it possible to automate the entire manufacturing process of the touch panel 100.

4 Claims, 4 Drawing Sheets

TOUCH PANEL

CROSS REFERENCE TO RELATED APPLICATION

This application claims the benefit of Korean Patent Application No. 10-2010-0026800, filed on Mar. 25, 2010, entitled "Touch Panel", which is hereby incorporated by reference in its entirety into this application.

BACKGROUND OF THE INVENTION

1. Technical Field

The present invention relates to a touch panel.

2. Description of the Related Art

Alongside the growth of computers using digital technology, devices assisting the computers have also been developed, and personal computers, portable transmitters and other personal information processors execute processing of text and graphics using a variety of input devices such as a keyboard, mouse, and so on.

While the rapid advancement of the information-based society has been widening the use of computers more and more, there have been occurring the problems of it being difficult to efficiently operate products using only the keyboard and mouse as being currently responsible for the input device function. Thus, the demand for a device which is simple, has a little function, and has the capability to input easily is increasing.

Furthermore, current techniques for input devices exceed the level of fulfilling general functions and thus are progressing towards techniques related to high reliability, durability, innovation, designing and manufacturing. To this end, a touch panel has been developed as an input device capable of inputting information such as text and graphics.

The touch panel is mounted on the display surface of a flat panel display device such as an electronic organizer, a liquid crystal display (LCD), a plasma display panel (PDP), an electroluminescence (El) element or the like, and the display surface of an image display device such as a cathode ray tube (CRT), so that a user selects the information desired while viewing the image display device.

The touch panel is classifiable as a resistive type, a capacitive type, an electromagnetic type, a surface acoustic wave (SAW) type, and an infrared type. The type of touch panel selected is one that is adopted for an electronic product in consideration of not only signal amplification problems, resolution differences and the degree of difficulty of designing and manufacturing technology but also in light of optical properties, electrical properties, mechanical properties, resistance to the environment, input properties, durability and economic benefits of the touch panel. In particular, a resistive type touch panel and a capacitive type touch panel are prevalently used.

However, in the touch panel according to the related art, problems occur in connecting signal wirings formed on a transparent substrate to a flexible printing cable (FPC). FIG. 1 is a perspective view of a touch panel according to the related art. Problems of the related art will be described with reference to FIG. 1.

As shown in FIG. 1, the touch panel 10 according to the related art includes a transparent substrate 20, a transparent electrode 30 that is formed on the transparent substrate 20, signal wirings 40 that are extended from the transparent electrode 30 and gathered into one end of the transparent substrate 20, and a controller 50 that is connected to the signal wirings 40 through a flexible printing cable 60. Herein, the flexible printing cable 60 serves to transfer the signals generated from the transparent electrode 30 to the controller 50 via the signal wirings 40. At this time, the flexible printing cable 60 need to be certainly connected to the signal wirings 40 in order to secure the reliability of the signal transfer of the flexible printing cable 60. Presently, however, a connection A between the flexible printing cable 60 and the signal wirings 40 are manually connected using a conductive adhesive. Therefore, a roll to roll (R2R) process cannot be applied during the manufacturing process of the touch panel, such that the manufacturing costs of the touch panel cannot be reduced. In addition, the flexible printing cable 60 is manually connected to the signal wirings 40 and thus the connection A is structurally weak, such that defects occur when a force of predetermined strength or more is applied.

SUMMARY OF THE INVENTION

The present invention has been made in an effort to provide a touch panel that can omit a flexible printing cable by adopting a projection part to a transparent electrode and directly connecting signal wirings to a controller and thus can allow a roll to roll (R2R) process during a manufacturing process of the touch panel.

An aspect of the present invention provides a touch panel, including: a transparent substrate that includes a base part and a projection part projected from the base part; a transparent electrode that is formed on the base part; signal wirings that are formed on the transparent substrate, having one end connected to the transparent electrode and the other end extended to the projection part; and a controller that is disposed on the projection part and is directly connected to the other end of the signal wiring. Herein, the projection part is projected from one end or both ends of the base part.

Also, the transparent electrode is formed on both surfaces of the base part and the signal wirings are formed on both surfaces of the transparent substrate.

Also, the controller includes a projection terminal that is connected to the other end of the signal wiring.

Also, the base part and the projection part are formed in one body.

BRIEF DESCRIPTION OF THE DRAWINGS

The features and advantages of the present invention will be more clearly understood from the following detailed description taken in conjunction with the accompanying drawings, in which.

DESCRIPTION OF THE PREFERRED EMBODIMENTS

Figure 1:
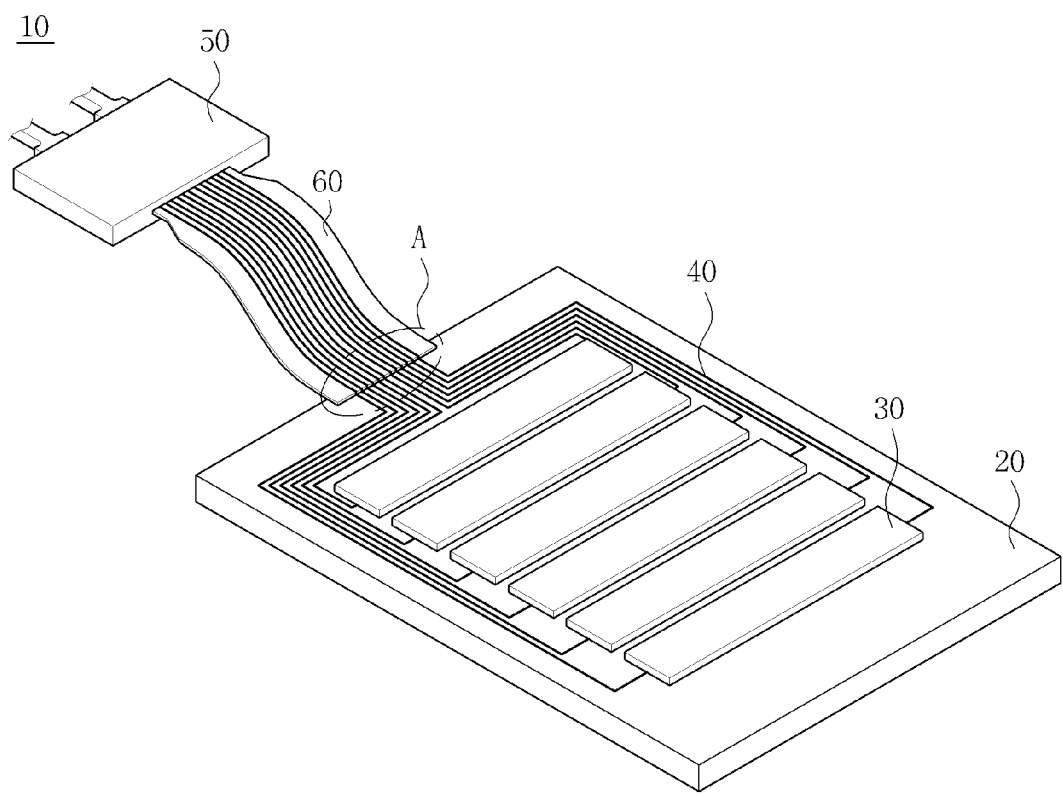
FIG. 1 is a perspective view of a touch panel according to the related art.

The features and advantages of the present invention will be more obvious from the following description with reference to the accompanying drawings.

Terms or words used in the specification and claims herein should be not construed as a general and lexical meaning and should be construed as the meaning and concept meeting the technical idea of the present invention based on a principle that the present inventors can properly define the concepts of terms in order to elucidate their own invention in the best method.

The above and other objects, features and advantages of the present invention will be more clearly understood from the following detailed description taken in conjunction with the accompanying drawings. In the specification, in adding reference numerals to components throughout the drawings, it is to be noted that like reference numerals designate like components even though components are shown in different drawings. Further, in describing the present invention, a detailed description of related known functions or configurations will be omitted so as not to obscure the subject of the present invention.

Hereinafter, exemplary embodiments of the present invention will be described in detail with reference to the accompanying drawings.

Figure 2:
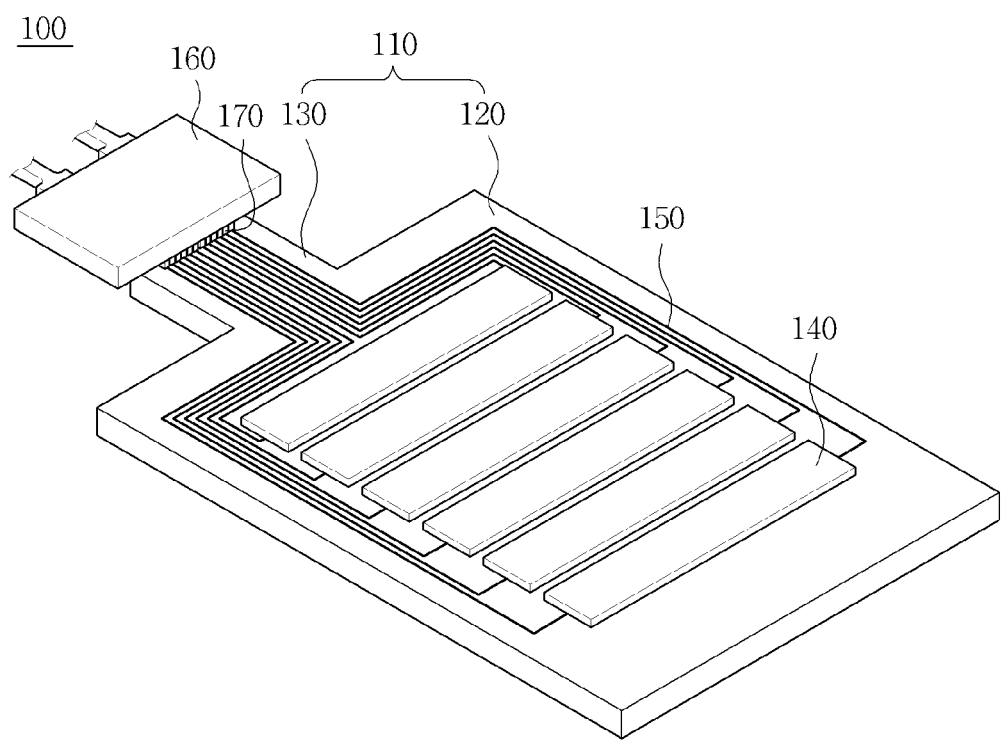
FIGS. 2 and 3 are perspective views of a touch panel according to a first embodiment of the present invention.
Figure 3:
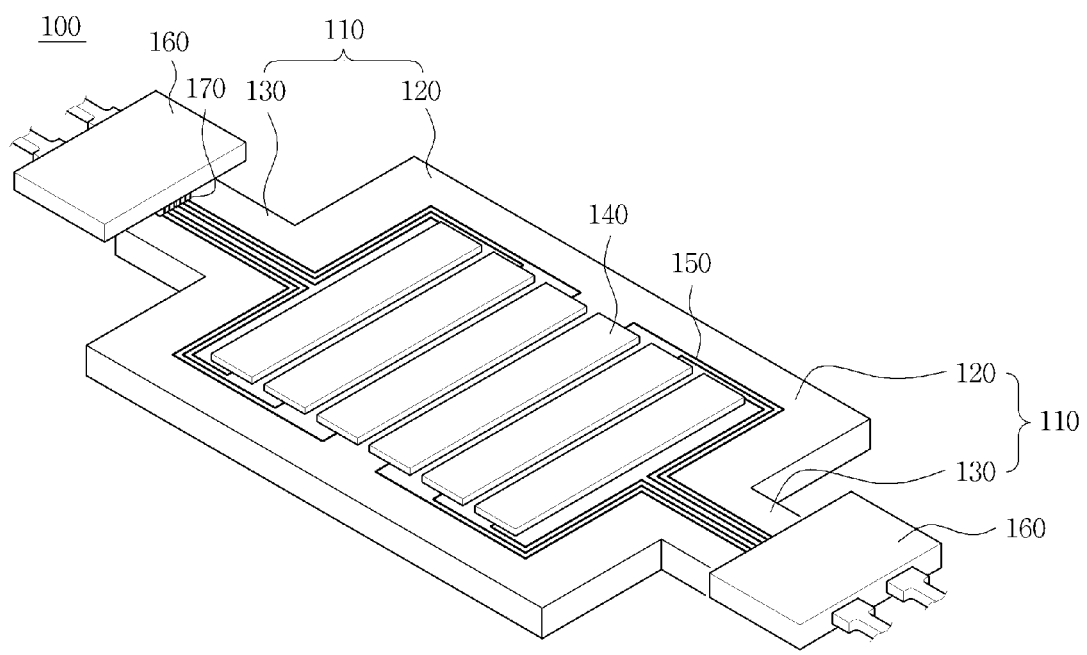

FIGS. 2 and 3 are perspective views of a touch panel according to a first embodiment of the present invention.

As shown in FIGS. 2 and 3, the touch panel 100 according to the present embodiment includes a transparent substrate 110 that includes a base part 120 and a projection part 130 projected from the base part 120, a transparent electrode 140 that is formed on the base part 120, signal wirings 150 that are formed on the transparent substrate, having one end connected to the transparent electrode 140 and the other end extended to the projection part 130, and a controller 160 that is disposed on the projection part 130 and is directly connected to the other end of the signal wiring 150.

The transparent substrate 110 includes the base part 120 on which the transparent electrode 140 is formed and the projection part 130 to which the signal wirings 150 are extended. Herein, the projection part 130 is adopted in order to omit a flexible printing cable. The projection part 130 is formed to be projected from one end of the base part 120 (see FIG. 2) or both ends thereof (see FIG. 3). Although the projection part 130 is illustrated in the form of a quadrangle in the drawings, it is not particularly limited thereto but may be formed in various shapes in consideration of the connection with the controller 160. Meanwhile, the projection part 130 is defined so as to be distinguished from the base part 120 but there is no need to separately form the projection part 130 to be coupled to the base part 120. Therefore, it is desirable to form the base part 120 and the projection part 130 in one body using the same material in order to reduce a manufacturing process. In addition, the material of the transparent substrate 110 is not particularly limited, and may include polyethyleneterephthalate (PET), polycarbonate (PC), polymethylmethacrylate (PMMA), polyethylenenaphthalate (PEN), polyethersulfone (PES), cyclic olefin copolymer (COC), triacetylcellulose (TAC) film, polyvinyl alcohol (PVA) film, polyimide (PI) film, polystyrene (PS), biaxially oriented polystyrene (BOPS; containing K resin), glass or reinforced glass and so on.

The transparent electrode 140 serves to generate signals when a user touches it so that the touched coordinates are recognized by the controller 160. Herein, the transparent electrode 140 is formed on the base part 120 of the transparent substrate 110. Therefore, in order to activate the surface of the base part 120 (improve adhesion), it is preferable to perform a high frequency process or a primer process on the base part 120 before forming the transparent electrode 140. In addition, the material of the transparent electrode 140 is not particularly limited, but may include a conductive polymer having excellent flexibility and a simple coating process or indium tin oxide (ITO). At this time, the conductive polymer includes poly-3,4-ethylenedioxythiophene/polystyrenesulfonate (PE-DOT/PSS), polyaniline, polyacetylene, or polyphenylenevinylene. Meanwhile, although the transparent electrode 140 is illustrated in the form of a rod in the drawing, it may be formed in any type of pattern such as a triangular shape, a lozenge shape, a hexagonal shape, or an octagonal shape that is well-known in the art to which the present invention pertains.

The signal wirings 150 serve to transfer the signals generated from the transparent electrode 140 to the controller 160. Herein, the signal wirings 150 are formed on the transparent electrode 110, wherein one end of the signal wiring 150 is connected to the transparent electrode 140 and the other end thereof is extended to the projection part 130. Therefore, when the projection part 130 is projected from one end of the base part 120, the other end of the signal wiring 150 is gathered into one projection 130 part (see FIG. 2) and when the projection parts 130 are projected from both ends of the base part 120, the other end of the signal wiring 150 is gathered into the projection parts 130 on both ends thereof (see FIG. 3). Further, the signal wirings 150 may be printed using silk screening, gravure printing, or ink-jet printing. At this time, the signal wirings 150 may be made of silver (Ag) paste or organic Ag having superior electrical conductivity, but the present invention is not limited thereto. In addition, a conductive polymer material, carbon black (including carbon nanotubes), or a low resistive metal including metal or a metal oxide such as ITO may be used.

Meanwhile, although the signal wirings 150 are illustrated to be connected to both ends of the transparent electrode 140, they may also be connected to only one end of the transparent electrode 140 according to the type of the touch panel 100

The controller 160 serves to recognize touch coordinates by receiving the signals generated from the transparent electrode 140 using the signal wirings 150. The touch panel according to the present embodiment adopts the projection part 130 into which the signal wirings 150 are gathered, thereby making it possible to omit a flexible printing cable and directly connect the controller 160 to the other end of the signal wiring 150, differently from the related art. Therefore, the touch panel can omit the flexible printing cable requiring manual work, thereby making it possible to automate the entire manufacturing process of the touch panel 100 by introducing a roll to roll (R2R) process. Further, the flexible printing cable is omitted, thereby making it possible to prevent possible defects due to the connection between the flexible printing cable and the signal wirings 150.

Meanwhile, in order to secure the connection reliability between the controller 160 and the signal wirings 15, it is preferable that the controller 160 includes a projection terminal 170 that is connected to the signal wirings 150. At this time, the controller 160 is adhered to the projection part 130 using a conductive adhesive such as ACA or the like, thereby making it possible to connect the projection terminal 170 to the signal wirings 150. Alternatively, the controller 160 is pressed in the direction of the projection part 130 using an external case (not shown) of the touch panel 100, thereby making it possible to connect the projection terminal 170 to the signal wirings 150.

In addition, when the projection part 130 is projected from one end of the base part 120, the other end of the signal wiring 150 is gathered into one projection 130 part so that one controller 160 may be provided (see FIG. 2) and when the projection parts 130 are projected from both ends of the base part 120, the other end of the signal wiring 150 is gathered into the projection parts 130 on both ends thereof so that two controllers 160 may be provided (see FIG. 3). However, the number of controllers 160 is not limited thereto but may be varied according to the projection position of the projection part 130 and the design change of the controller 160.

The touch panel 100 according to the present embodiment has a structure in which the transparent electrode 140 is a single layer, such that it may be used in a self capacitive type touch panel. Further, the two touch panels 100 have a structure in which their transparent electrodes 140 are disposed opposite to each other, that is, a double-layer structure, such that they may be used in a mutual capacitive type touch panel or a resistive type touch panel.

Figure 4:
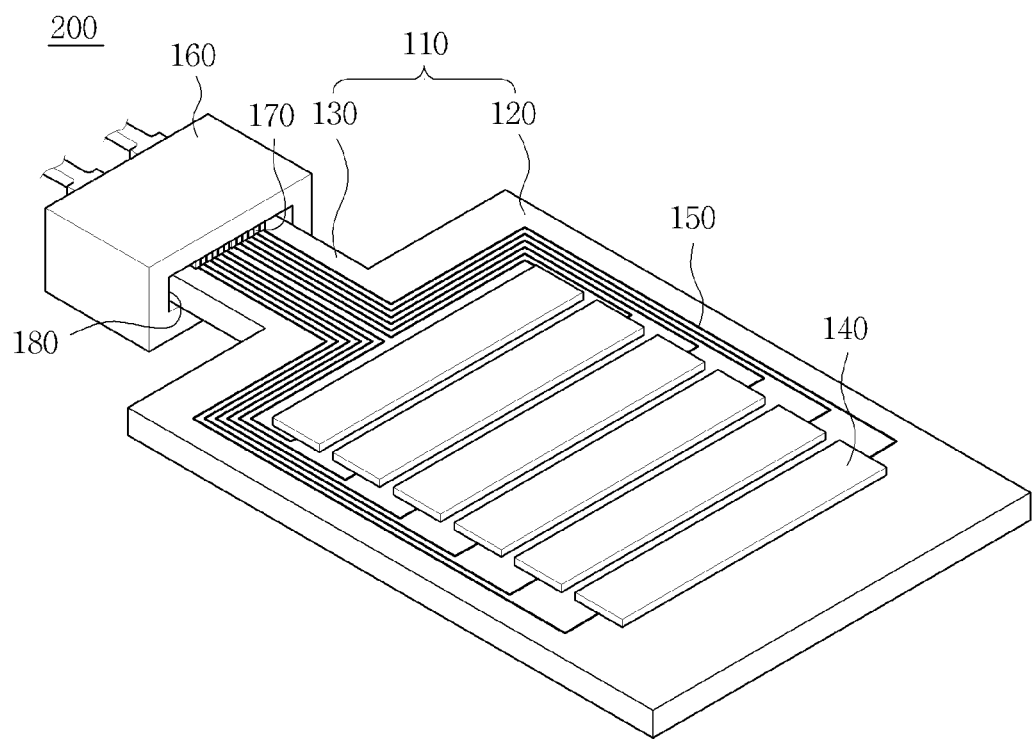
FIG. 4 is a perspective view of a touch panel according to a second embodiment of to the present invention.
Figure 5:
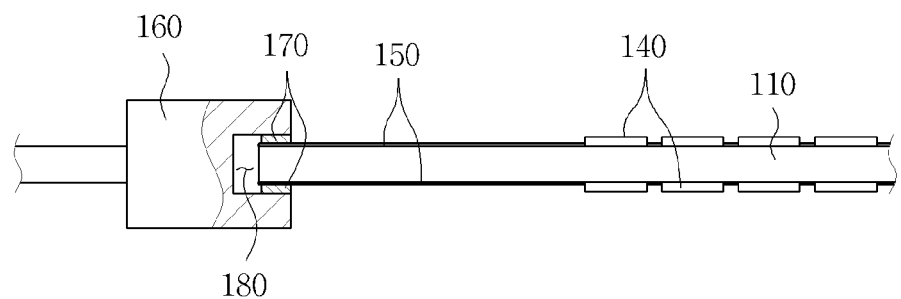
FIG. 5 is a side view of the touch panel of FIG. 4.

FIG. 4 is a perspective view of a touch panel according to a second embodiment of the present invention, and FIG. 5 is a side view of the touch panel of FIG. 4.

The touch panel 200 according to the present embodiment includes a transparent electrode 140 and signal wirings 150 formed on both surfaces of a transparent substrate 110, different from the touch panel 100 according to the first embodiment. In other words, the transparent electrode 140 is formed on the transparent substrate 110, such that the transparent electrode 140 formed on both surfaces thereof is isolated by the transparent substrate 110. Therefore, the touch panel 200 according to the present embodiment may be used as a mutual capacitive type touch panel having a double-layer structure.

Meanwhile, the signal wirings 150 are formed on both surfaces of the projection part 130 of the transparent substrate 110, such that a cavity 180 may be formed in the controller 160 and the projection part 130 be inserted into the cavity 180 (see FIGS. 4 and 5). At this time, it is preferable that the projection terminal 170 of the controller 160 is disposed on upper and lower surfaces of the cavity 180 and is thus connected to the signal wirings 150 with simultaneously inserting the projection part 130. However, the present invention is not limited thereto but two controllers 160 may be provided to be connected to signal wirings 150 on both surfaces of the projection part 130, respectively.

According to the present invention, the touch panel directly connects the signal wirings to the controller by adopting the projection part to the transparent substrate, thereby making it possible to omit the flexible printing cable requiring manual work, and thus allows to the roll to roll (R2R) process, thereby making it possible to automate the entire manufacturing process of the touch panel.

According to the present invention, the touch panel omits the flexible printing cable, thereby making it possible to prevent possible defects due to the connection between the flexible printing cable and the signal wirings.

Although the preferred embodiments of the present invention have been disclosed for illustrative purposes, they are for specifically explaining the present invention and thus the actuator module according to the present invention is not limited thereto, but those skilled in the art will appreciate that various modifications, additions and substitutions are possible, without departing from the scope and spirit of the invention as disclosed in the accompanying claims. Accordingly, such modifications, additions and substitutions should also be understood to fall within the scope of the present invention.

What is claimed is:

1. A touch panel, comprising:
   a transparent substrate that includes a base part and a projection part projected from the base part;
   a transparent electrode that is formed on the base part;
   signal wirings that are formed on the transparent substrate, having one end connected to the transparent electrode and the other end extended to the projection part; and
   a controller that is disposed on the projection part and is directly connected to the other end of the signal wiring,
   wherein the projection part is projected from one end or the other end of the base part; and
   wherein the controller is bonded to the projection part by a conductive adhesive and is pressed in the direction of the projection part in order to connect the controller to the projection part.

2. The touch panel as set forth in claim 1, wherein the transparent electrode is formed on both surfaces of the base part and the signal wirings are formed on both surfaces of the transparent substrate.

3. The touch panel as set forth in claim 1, wherein the controller includes a projection terminal that is connected to the other end of the signal wiring.

4. The touch panel as set forth in claim 1, wherein the base part and the projection part are formed in one body.

\* \* \* \* \*